United States Patent [19]
Zellmer

[11] Patent Number: 5,842,378
[45] Date of Patent: Dec. 1, 1998

[54] DUAL PEDAL MOUNTING STRUCTURE

[75] Inventor: Timothy Paul Zellmer, Horicon, Wis.

[73] Assignee: Deere & Company, Moline, Ill.

[21] Appl. No.: 820,211

[22] Filed: Mar. 18, 1997

[51] Int. Cl.$^6$ ............................ B60K 20/04; G05G 11/00
[52] U.S. Cl. .......................................... 74/473.17; 74/478
[58] Field of Search .......................... 74/473.16, 473.17, 74/480 R, 490.15, 478

[56] References Cited

U.S. PATENT DOCUMENTS

| | | | |
|---|---|---|---|
| 3,691,863 | 9/1972 | Shaffer | 74/478 |
| 3,910,133 | 10/1975 | Oestmann | 74/490.15 |
| 3,943,712 | 3/1976 | Stuhr | 60/327 |
| 3,995,510 | 12/1976 | Yost | 74/478 X |
| 4,129,047 | 12/1978 | Dornan | 74/473.17 |
| 4,245,527 | 1/1981 | Hildebrecht | 74/478 X |
| 4,413,466 | 11/1983 | Beugelsdyk et al. | 74/483 R X |
| 4,883,137 | 11/1989 | Wanie et al. | 180/6.34 |
| 4,977,760 | 12/1990 | Ishimori et al. | 60/444 |
| 5,022,477 | 6/1991 | Wanie | 180/6.34 |
| 5,048,638 | 9/1991 | Duncan et al. | 180/307 |
| 5,231,891 | 8/1993 | Morita et al. | 74/473.17 X |
| 5,383,376 | 1/1995 | Thorman et al. | 74/473.16 X |

OTHER PUBLICATIONS

Deere & Co., Deere & Co. Parts Catalog PC2428 entitled "325 and 345 Lawn & Garden Tractors", pp. 80–12 and 80–13, dated 19 Sep. 1995, published in the U.S.A.

*Primary Examiner*—Rodney H. Bonck
*Assistant Examiner*—Scott Lund

[57] ABSTRACT

A mechanism for mounting a forward pedal and a reverse pedal to a vehicle. The forward pedal is fixed to a primary shaft, and the reverse pedal is fixed to a secondary shaft. A control arm and control rod operatively extend between the primary shaft and a transmission. A linkage extends between the reverse pedal and the primary shaft for pivoting the primary shaft and shifting the control rod in reverse directions such that the transmission shifts to reverse modes when the operator engages the reverse pedal. The linkage includes a reverse arm coupled with the primary shaft, and a reverse link extending between the reverse arm and the reverse pedal. A bracket member fixed to a floor plate of the vehicle supports the primary and secondary shafts, and is fixed to the vehicle generally directly beneath the foot of the operator. The bracket member supports each shaft at at least two locations laterally spaced a substantial distance. Mating shapes are defined between the reverse arm and the primary shaft for fixing the primary shaft for rotation with the reverse arm. Mating shapes are also defined between the reverse shaft and reverse pedal for transmitting pivotal motion therebetween. The reverse link is confined in engagement with the reverse pedal and the reverse arm by abutment with the bracket member.

24 Claims, 3 Drawing Sheets

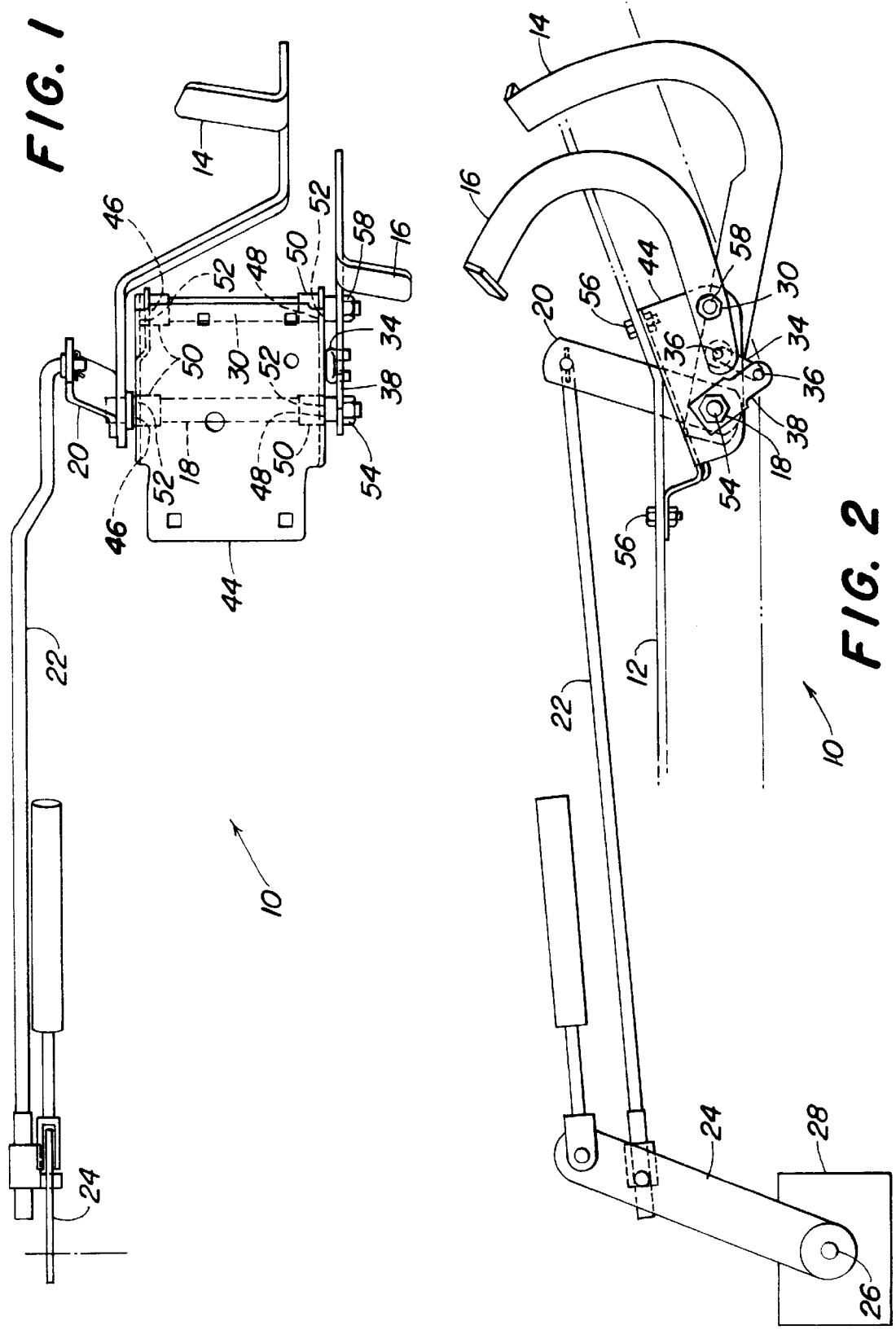

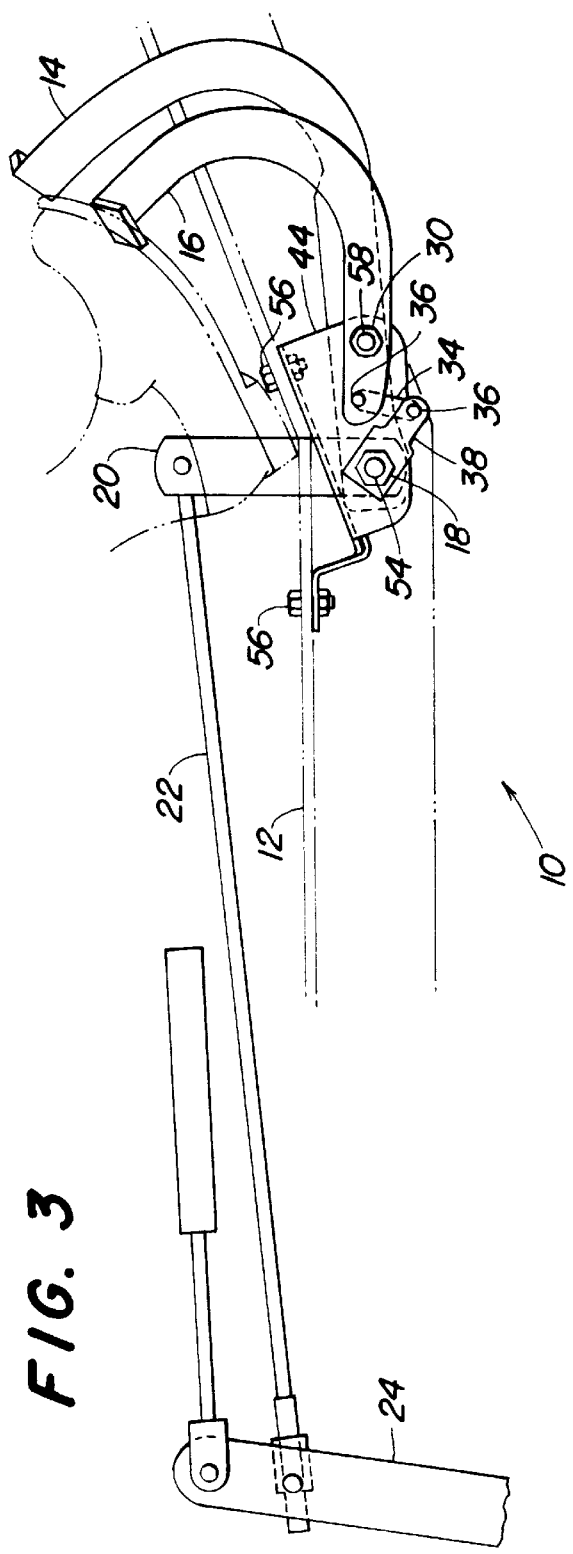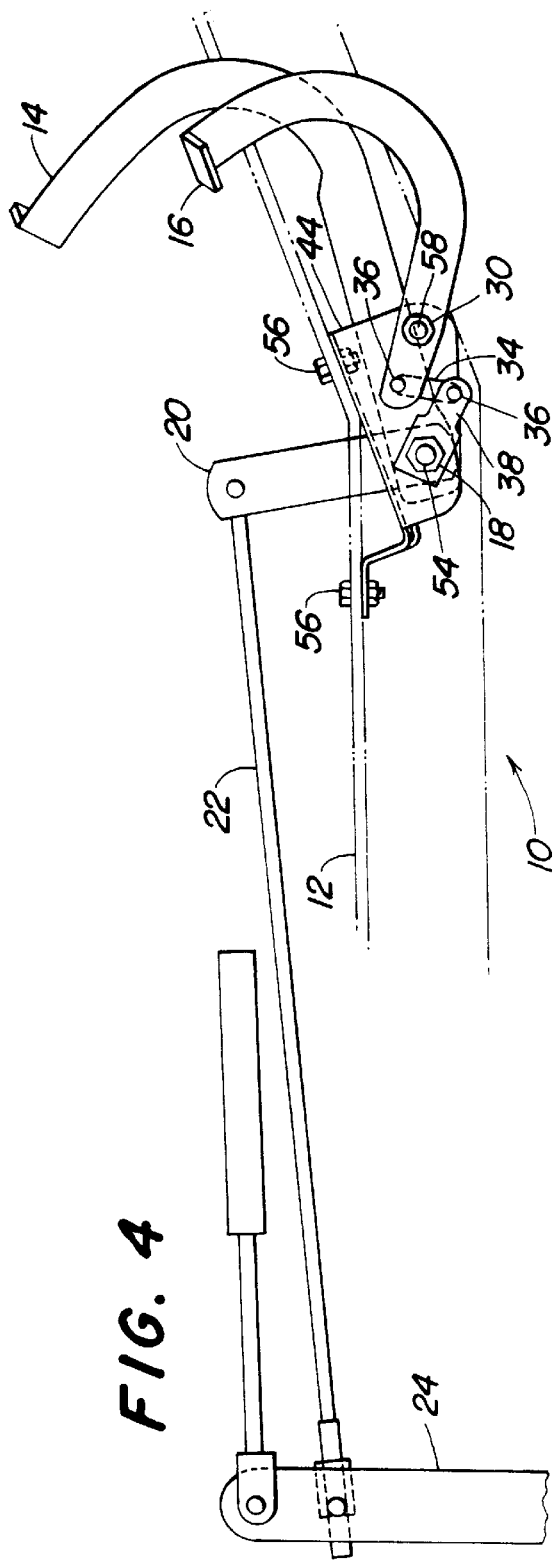

DUAL PEDAL MOUNTING STRUCTURE

BACKGROUND OF THE INVENTION

The present invention relates to the mounting structures which couple forward and reverse pedals to working vehicles such as lawn mowers.

It is known to provide working vehicles such as lawn mowers with hydrostatic transmissions that provide infinite speed adjustments in both forward and reverse modes of operation. Some such work vehicles include a forward pedal that the operator presses to initiate forward travel and to control the forward speed of the vehicle. These vehicles typically also provide a reverse pedal that the operator can press to initiate travel in the reverse direction and to control the speed of the vehicle in reverse. The forward and reverse pedals are typically mounted to shafts that are pivotally supported by the frame of the vehicle. The vehicle frame is typically not positioned proximate to the operator's foot during operation, and therefore the shafts typically extend a substantial distance outwardly from the frame structure in cantilevered fashion. This generally requires that the shafts be supported within the frame structure by substantial attachment hardware or bearing devices that are capable of withstand the loads imparted to the cantilevered shafts during operation. The shafts, attachment hardware and bearing devices of these cantilevered devices must be designed such that they provide a rigid structure that creates a solid feel for the operator during operation. Some prior art dual pedal mechanisms include cam surfaces and bearings designed to operatively shift the transmission to reverse modes when the reverse pedal is pressed by the operator. Typical two pedal mechanisms therefore tend to include a relatively large number of relatively costly parts.

It would therefore be desirable to provide a two pedal device operative to control a hydrostatic transmission of a working vehicle such as a lawn mower which is simple in construction and relatively inexpensive to manufacture. It would be desirable for such a mechanism to be comprised of relatively few and inexpensive parts that facilitate quick assembly and that establishes a solid feel for the operator during operation.

SUMMARY OF THE INVENTION

According to the present invention, a mechanism for mounting a forward pedal and a reverse pedal to a vehicle is provided. The forward pedal is fixed as by welds to a primary shaft which is supported by a pivot bracket. A control arm is also fixed as by welds to the primary shaft, and is operatively coupled with a hydrostatic transmission by way of a control rod. As the operator presses the forward pedal, the primary shaft and control arm pivot therewith causing the rod to shift forwardly and the transmission to shift to a forward mode. A reverse pedal is fixed with a secondary shaft spaced forwardly from the primary shaft. The secondary shaft is linked to the primary shaft by way of a reverse link and reverse arm. As the operator presses the reverse pedal the secondary shaft pivots therewith, causing the reverse link and reverse arm to pivot the primary shaft in the opposite direction. This causes the control rod to shift rearwardly for shifting the transmission to a reverse operating mode. The pivot bracket supports both the primary and secondary shafts in spaced relation to each other. The pivot bracket is positioned generally directly beneath the foot of the operator during operation, and therefore the shafts are not required to be supported in cantilevered fashion from the vehicle frame.

The pivot bracket supports the primary shaft at two locations substantially spaced from each other to thereby effectively and efficiently rigidly support the primary shaft during operation. Similarly, the pivot bracket also supports the secondary shaft at two location sustantially spaced from each other to thereby effectively and efficiently rigidly support the secondary shaft during operation. The loads imparted to the shafts are effectively resisted by the laterally spaced locations at which the pivot bracket supports the shafts.

The mounting mechanism according to the present invention includes various parts having mating shapes which serve to transmit pivotal motion. These attaching means serve to eliminate the need for costly weldments and generally reduce the cost of manufacturing. Since the heat of the welding process is not experienced by the assembly, plastic bearing sleeves which would otherwise melt or deform under the heat of nearby welding can be used. These plastic bearing sleeves are relatively inexpensive and help lower the overall cost of the pedal mounting mechanism.

The part count is reduced by the reverse link according to the present invention. The reverse link is generally U-shaped and is held or confined within openings in the reverse pedal and the reverse arm by abutment with the pivot bracket. Additional attaching hardware is therefore not required, and the overall part count is reduced. Manufacturing is also simplified by the elimination of attachment hardware that must be assembled to the mechanism.

The pivot bracket according to the present invention mounts directly to the underside of a floor plate or fenderdeck of the vehicle. The mounting mechanism according to the present invention can be subassembled and mounted to the floor plate in such a manner that assembly and manufacturing costs are generally reduced.

BRIEF DESCRIPTION OF THE DRAWING

FIG. 1 is a partial top view of the pedal mounting mechanism according to the present invention shown with the forward pedal pressed to a forward operating mode, and with the floor plate not shown.

FIG. 2 is a side view of the pedal mounting mechanism shown with the forward pedal pressed to a forward operating mode.

FIG. 3 is a side view of the pedal mounting mechanism shown in the neutral mode with the operator's foot disengaged from forward and reverse pedals.

FIG. 4 is a side view of the pedal mounting mechanism shown with the operator's foot pressing the reverse pedal to a reverse operating mode.

DETAILED DESCRIPTION OF THE PREFERRED EMBODIMENTS

Figure 5:
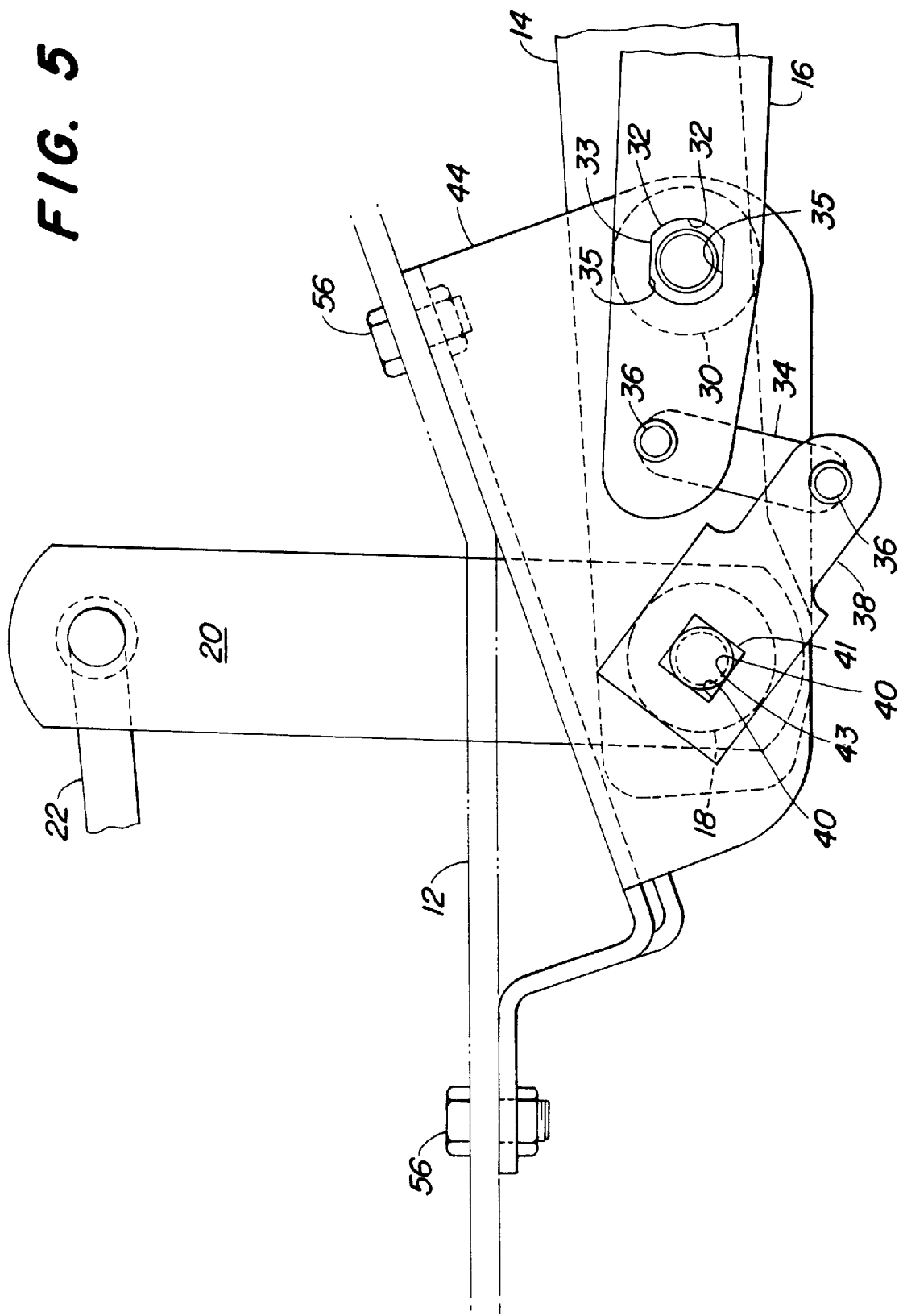
FIG. 5 is a side view of the pedal mounting mechanism according to the present invention with nuts removed for showing the mating shapes between the primary shaft and the reverse arm, and the mating shapes between the secondary shaft and the reverse pedal.

Referring now to FIGS. 1–4, there is shown the dual foot pedal linkage mechanism 10 according to the preferred embodiment of the present invention. A lawn tractor vehicle includes a frame (not shown) and a fender deck or foot platform 12 mounted therewith. An operator sits on a seat during operation such that his foot is supported by the foot platform 12. A pair of pedals 14 and 16 extend upwardly through the floor platform 12 and are engagable by the operator's foot for controlling the forward or rearward movement of the vehicle.

The pedals 14 and 16 and linkage 10 are adapted for controlling the forward movement of the vehicle. The forward foot pedal 14 extends upwardly through a slot in the floor platform 12 and is rigidly fixed for pivotal movement with a primary shaft 18. A control arm 20 is also fixed with the forward pedal 14 for pivotal motion about the axis defined by the primary shaft 18. A control rod 22 pivotally extends between the control arm 20 and a transmission arm 24 which is mounted to a hydrostatic transmission input shaft 26. As the operator presses the forward pedal 14 from the neutral position shown in FIG. 3, the primary shaft 18 and control arm 20 pivot therewith, causing the control rod 22 and transmission arm 24 to shift to the right to the position shown in FIG. 2 such that the transmission 28 is shifted to a forward mode. As the operator presses the forward pedal 14 further, the transmission 28 is shifted to faster forward speeds.

The linkage 10 is also adapted for controlling the rearward movement of the vehicle. The reverse pedal 16 extends upwardly through a slot in the foot platform 12 for engagement by the operator. The reverse pedal 16 is fixed for pivotal motion with a secondary shaft 30 spaced forwardly from the primary shaft 18. Mating shapes 32, as best seen in FIG. 5, include flatted portions 35 and 33 defined on the reverse pedal 16 and the secondary shaft 30, respectively, such that the reverse pedal 16 and secondary shaft 30 are fixed for transmitting rotational motion therebetween. A reverse link 34 is positioned within openings 36 formed in the reverse pedal 16 and a reverse arm 38. The reverse arm 38 is fixed with the primary shaft 18 by way of mating shapes 40 including flatted portions 43 and 41 and a nut 54. As the operator pressed the reverse pedal 16 with his foot the secondary shaft 30 pivots with the reverse pedal 16 to a position shown in FIG. 4. The reverse link 34 shifts in response to pivoting of the reverse pedal 16, causing the reverse arm 38, primary shaft 18 and control arm 22 to pivot in a counterclockwise direction from its neutral position to the position shown in FIG. 4. This causes the control rod 22 to be pressed to the left from the neutral position shown in FIG. 3 to the position shown in FIG. 4, which shifts the transmission arm 24 and transmission 28 to reverse driving modes. As the operator presses the reverse pedal 16 further, the transmission 28 will be shifted to higher reverse speeds.

A pivot bracket 44 is provided by the present invention for pivotally supporting the primary and secondary shafts 18 and 30 during operation. The pivot bracket 44 also supports the forward and reverse pedals 14 and 16, since the pedals 14 and 16 are supported by the shafts 18 and 30. The pivot bracket 44 is bolted beneath the foot platform 12 which is mounted with the frame of the vehicle. The pivot bracket 44 supports the shafts 18 and 30 at laterally spaced locations 46 and 48 such that the shafts 18 and 30 are held firmly in place to effectively and efficiently resist forces encountered during operation. The pivot bracket 44 is located directly beneath the foot of the operator, and therefore supports the primary and secondary shafts 18 and 30 directly beneath the operator's foot without requiring the shafts 18 and 30 to be supported in cantilevered fashion from the vehicle frame, which would require more sturdy and costly attachment hardware. By positioning the pivot bracket 44 directly beneath the operator's foot according to the present invention, the pedals 14 and 16 are firmly supported during vehicle operation by a simple structure that is relatively inexpensive to manufacture and assemble.

The reverse link 34 is pivotally coupled with the reverse pedal 16 and the reverse arm 38 without any attaching hardware. The reverse link 34 is a generally U-shaped rod member that is confined within the openings 36 in the reverse pedal 16 and the reverse arm 38 by the presence of the pivot bracket 44. The pivot bracket 44 prevents the reverse link 34 from coming out of the openings 36 in the reverse pedal 16 and reverse arm 38. No attaching hardware is required, and therefore the part count is reduced, as well as assembly time and complexity.

Next, the assembly of the linkage 10 according to the present invention will be discussed. The forward pedal 14, control arm 22 and primary shaft 18 are first welded together. Bearings 50 such as plastic bearing sleeves are positioned in the openings 52 of the pivot bracket 44 that will receive the primary and secondary shafts 18 and 30. The primary shaft 18 is then positioned within the appropriate bearings 50. The reverse arm 38 is then slid onto the end of the primary shaft 18 such that the mating shapes 40 engage one another. A nut 54 is then threaded onto the end portion of the primary shaft 18. The reverse link 34 is then positioned within the opening 36 in the reverse arm 38. The secondary shaft 30 is positioned in the appropriate bearings 50. The pivot bracket 44 and parts coupled thereto are then mounted as a subassembly to the underside of the foot platform 12 by way of bolts 56. To attach the pivot bracket 44 to the foot platform 12, the assembler must insert the forward pedal 14 upwardly through a slot in the floor platform 12. The reverse pedal 16 is then inserted downwardly through a slot in the floor platform 12 and positioned on the end of the secondary shaft 30 such that the mating shapes 32 engage one another. As the reverse pedal 16 is placed on the secondary shaft 30, the reverse link 34 is fed into its opening 36 in the reverse pedal 16. A nut 58 is then threaded onto the end portion of the secondary shaft 30 for confining the reverse pedal 16 in place on the end of the secondary shaft 30. The control rod 22 attached to the transmission arm 24 can then be coupled with the control arm 20 such that the pedals 14 and 16 will control the transmission 28 during operation of the lawn vehicle.

The subassembly referred to above can be assembled separately and in advance of the final assembly process. The subassembly according to the present invention therefore allows the mechanism to be assembled easily, quickly and inexpensively. The use of mating shapes throughout the linkage eliminates the need for welds which are costly and might damage or melt plastic bearings 50. Plastic bearings 50 are advantageous because they are relatively inexpensive and are easily installed. The use of mating shapes 32 and 40 and nuts 54 and 58 according to the present invention generally helps reduce the overall manufacturing cost of the device.

The preferred embodiment of the present invention provides a secondary shaft 30 which extends a substantial distance laterally for being supported at laterally spaced locations by the pivot bracket 44. However, a short stub shaft or bushing could also support the reverse pedal 16 within the pivot bracket 44 within the scope of the present invention.

What is claimed is:

1. A mechanism for mounting a forward pedal and a reverse pedal to a vehicle, said pedals being adapted to pivot in the same direction when engaged by an operator, said mechanism comprising:

a primary shaft to which the forward pedal is fixed, a secondary shaft to which the reverse pedal is fixed, said secondary shaft being spaced from the primary shaft, a control arm fixed with the primary shaft, a control rod coupled with the control arm and also operatively coupled with a transmission, said control rod being shiftable in a first direction for shifting the transmission to forward modes as the operator engages the forward pedal, a linkage operatively extending between the reverse pedal and the primary shaft for pivoting the primary shaft and shifting the control rod in a second direction when the operator engages the reverse pedal such that the transmission shifts to reverse modes, a bracket member which operatively supports the primary and secondary shafts, said bracket member is fixed to the vehicle generally directly beneath the foot of the operator as the operator engages the forward or reverse pedals, the bracket member supports the primary shaft at at least two laterally spaced locations, one of which is proximate a location at which the forward pedal is fixed to the primary shaft, and the bracket member includes a portion extending laterally between the at least two laterally spaced locations.

2. The invention of claim 1, wherein said bracket member is fixed to a floor plate member of the vehicle.

3. The invention of claim 1, wherein the bracket member extends laterally to support the secondary shaft at at least two laterally spaced locations, one of which is proximate a location at which the reverse pedal is fixed to the secondary shaft.

4. The invention of claim 1, wherein said linkage further comprises
    a reverse arm coupled with the primary shaft,
    a reverse link operatively extending between the reverse arm and the reverse pedal for transmitting motion of the reverse pedal through the reverse link, reverse arm, primary shaft, control arm and control rod when the operator engages the reverse pedal.

5. The invention of claim 4, wherein mating shapes are defined between the reverse arm and the primary shaft, and said mating shapes fix the primary shaft for pivotal motion with the reverse arm.

6. The invention of claim 5, wherein mating shapes are defined between the reverse pedal and the secondary shaft, and said mating shapes fix the secondary shaft for pivotal motion with the reverse pedal.

7. The invention of claim 4, wherein said reverse link is confined in engagement with the reverse pedal and the reverse arm by abutment with the bracket member.

8. The invention of claim 7, wherein said reverse link is generally U-shaped.

9. The invention of claim 4, wherein mating shapes are defined between the reverse pedal and the secondary shaft, and said mating shapes fix the secondary shaft for pivotal motion with the reverse pedal.

10. The invention of claim 1, wherein bearings are received by the bracket member for rotatively supporting the primary and secondary shafts.

11. The invention of claim 1, wherein said transmission is hydrostatic.

12. The invention of claim 1, wherein mating shapes are defined between the reverse pedal and the secondary shaft, and said mating shapes fix the secondary shaft for pivotal motion with the reverse pedal.

13. A mechanism for mounting a forward pedal and a reverse pedal to a vehicle, said pedals being adapted to pivot in the same direction when engaged by an operator, said mechanism comprising:
    a primary shaft to which the forward pedal is fixed,
    a secondary shaft to which the reverse pedal is fixed, said secondary shaft being spaced from the primary shaft,
    a control arm fixed with the primary shaft,
    a control rod coupled with the control arm and also operatively coupled with a transmission, said control rod being shiftable in a first direction for shifting the transmission to a forward modes as the operator engages the forward pedal,
    a linkage operatively extending between the reverse pedal and the primary shaft for pivoting the primary shaft and shifting the control rod in a second direction when the operator engages the reverse pedal such that the transmission shifts to reverse modes, said linkage further comprises
        a reverse arm coupled with the primary shaft,
        a reverse link operatively extending between the reverse arm and the reverse pedal for transmitting motion of the reverse pedal through the reverse link, reverse arm, primary shaft, control arm and control rod when the operator engages the reverse pedal,
    a bracket member which operatively supports the primary and secondary shafts, said bracket fixed to the vehicle generally directly beneath the foot of the operator as the operator engages the forward or reverse pedals, said bracket member supports the primary shaft at at least two laterally spaced locations, one of which is proximate a location at which the forward pedal is fixed to the primary shaft, the bracket member also supports the secondary shaft at at least two laterally spaced locations, one of which is proximate a location at which the reverse pedal is fixed to the secondary shaft, and the bracket member includes a portion extending laterally between both of the at least two laterally spaced locations.

14. The invention of claim 13, wherein said bracket member is fixed to a floor plate member of the vehicle.

15. The invention of claim 14, wherein mating shapes are defined between the reverse arm and the primary shaft, and said mating shapes fix the primary shaft for pivotal motion with the reverse arm.

16. The invention of claim 15, wherein mating shapes are defined between the reverse pedal and the secondary shaft, and said mating shapes fix the secondary shaft for pivotal motion with the reverse pedal.

17. The invention of claim 16, wherein said reverse link further is confined in engagement with the reverse pedal and the reverse arm by abutment with the bracket member.

18. The invention of claim 17, wherein said reverse link is generally U-shaped.

19. The invention of claim 18, wherein bearings are received by the bracket member for rotatively supporting the primary and secondary shafts.

20. The invention of claim 19, wherein said transmission is hydrostatic.

21. A mechanism for mounting a forward pedal and a reverse pedal to a vehicle, said pedals being adapted to pivot in the same direction when engaged by an operator, said mechanism comprising:
    a primary shaft to which the forward pedal is fixed,
    a secondary shaft to which the reverse pedal is fixed, said secondary shaft being spaced from the primary shaft,
    a control arm fixed with the primary shaft,
    a control rod coupled with the control arm and also operatively coupled with a transmission, said control rod being shiftable in a first direction for shifting the transmission to forward modes as the operator engages the forward pedal, a linkage operatively extending between the reverse pedal and the primary shaft for pivoting the primary shaft and shifting the control rod in a second direction when the operator engages the reverse pedal such that the transmission shifts to reverse modes, wherein said linkage further comprises:
  a reverse arm coupled with the primary shaft,
  a reverse link operatively extending between the reverse arm and the reverse pedal for transmitting motion of the reverse pedal through the reverse link, reverse arm, primary shaft, control arm and control rod when the operator engages the reverse pedal,
a bracket member which operatively supports the primary and secondary shafts, said bracket is fixed to the vehicle generally directly beneath the foot of the operator as the operator engages the forward or reverse pedals, and
wherein said reverse link is generally U-shaped and is confined in engagement with the reverse pedal and the reverse arm by abutment with the bracket member.

22. A mechanism for mounting a forward pedal and a reverse pedal to a vehicle, said pedals being adapted to pivot in the same direction when engaged by an operator, said mechanism comprising:
  a primary shaft to which the forward pedal is fixed,
  a secondary shaft to which the reverse pedal is fixed, said secondary shaft being spaced from the primary shaft,
  a control arm fixed with the primary shaft,
  a control rod coupled with the control arm and also operatively coupled with a transmission, said control rod being shiftable in a first direction for shifting the transmission to a forward mode as the operator engages the forward pedal,
  a linkage operatively extending between the reverse pedal and the primary shaft for pivoting the primary shaft and shifting the control rod in a second direction when the operator engages the reverse pedal such that the transmission shifts to reverse modes, said linkage further comprises
    a reverse arm coupled with the primary shaft,
    a reverse link operatively extending between the reverse arm and the reverse pedal for transmitting motion of the reverse pedal through the reverse link, reverse arm, primary shaft, control arm and control rod when the operator engages the reverse pedal,
  a bracket member which operatively supports the primary and secondary shafts, said bracket fixed to the vehicle generally directly beneath the foot of the operator as the operator engages the forward or reverse pedals, said bracket member supports the primary shaft at at least two laterally spaced locations, and the bracket member also supports the secondary shaft at at least two laterally spaced locations, said bracket member being fixed to a floor plate member of the vehicle,
  mating shapes are defined between the reverse arm and the primary shaft, and said mating shapes fix the primary shaft for pivotal motion with the reverse arm, and
  mating shapes are defined between the reverse pedal and the secondary shaft, and said mating shapes fix the secondary shaft for pivotal motion with the reverse pedal, and
  wherein said reverse link is generally U-shaped and is confined in engagement with the reverse pedal and the reverse arm by abutment with the bracket member.

23. The invention of claim 22, wherein bearings are received by the bracket member for rotatively supporting the primary and secondary shafts.

24. The invention of claim 23, wherein said transmission is hydrostatic.

* * * * *